US006223183B1

(12) United States Patent
Smith et al.

(10) Patent No.: US 6,223,183 B1
(45) Date of Patent: Apr. 24, 2001

(54) SYSTEM AND METHOD FOR DESCRIBING VIEWS IN SPACE, TIME, FREQUENCY, AND RESOLUTION

(75) Inventors: John R. Smith, New Hyde Park; Chung-Sheng Li, Ossining, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/493,435

(22) Filed: Jan. 29, 2000

Related U.S. Application Data

(60) Provisional application No. 60/117,695, filed on Jan. 29, 1999.

(51) Int. Cl.[7] ............................................. G06F 17/30
(52) U.S. Cl. ..................... 707/102; 707/100; 707/101; 345/419
(58) Field of Search .................... 707/1, 2, 3, 100, 707/101, 102; 348/36; 345/139, 424, 22, 419; 359/326

(56) References Cited

U.S. PATENT DOCUMENTS

| 5,384,725 | * | 1/1995 | Coifman et al. | 382/223 |
| 5,555,409 | * | 9/1996 | Leenstra, Sr. et al. | 707/101 |
| 5,710,835 | * | 1/1998 | Bradley | 708/801 |
| 5,937,408 | * | 8/1999 | Shoup et al. | 707/102 |
| 5,970,493 | * | 10/1999 | Shoup et al. | 707/100 |
| 6,014,671 | * | 1/2000 | Castelli et al. | 707/101 |
| 6,073,134 | * | 6/2000 | Shoup et al. | 707/100 |
| 6,108,657 | * | 8/2000 | Shoup et al. | 707/100 |

* cited by examiner

Primary Examiner—Wayne Amsbury
Assistant Examiner—Frantz Coby
(74) Attorney, Agent, or Firm—Wayne L. Ellenbogen; Anne Vachon Dougherty

(57) ABSTRACT

A system and method for uniformly describing space and frequency views of multi-dimensional lattice data, including regions, tilings and hierarchical decompositions of image, video, audio content, and time series data in space, time, frequency and resolution. The space and frequency view description scheme provides a way to specify regions in space, time, frequency and resolution in term of space and frequency views. This allows specification of concepts such as "half resolution", "upper right quadrant" or "high pass band", such as when referring to views of an image. The space and frequency view description scheme also provides for SFTilings comprising non-redundant sets of views and SFPartitionings which are SFTilings which completely cover the space, as well as SFHierarchical decompositions comprising hierarchies of SFViews where there are processing dependencies among views. The inventive system and method also provide a way to index these view, which is important in applications of progressive retrieval in which a client application can send requests for views of images stored at a server in terms of an index value. The space and frequency view description scheme handles the details concerning the access and relationship of views with different resolutions, spatial locations and sizes.

24 Claims, 17 Drawing Sheets

| FIG. 11A | FIG. 11B |

SYSTEM AND METHOD FOR DESCRIBING VIEWS IN SPACE, TIME, FREQUENCY, AND RESOLUTION

This application claims benefit to U.S. provisional application serial No. 60/117,695 filed Jan. 29, 1999.

This application is related to patent application Ser. No: 09/079,986 now U.S. Pat. No. 6,014,671 entitled "Interactive Retrieval and Caching of Multi-dimensional Data," by Castelli et al., IBM Docket No. YO998191 and to co-pending patent application Ser. No. 09/079,662 now pending entitled "Interactive Representation and Retrieval of Multi-dimensional Data Using View Elements," by Castelli et al., IBM Docket No. YO998191.

FIELD OF THE INVENTION

The present invention relates generally to a method for describing and indexing views of multi-dimensional lattice data such as images, video and audio in space, time, frequency and resolution; and further to a method for describing aggregate sets of the views to form tilings, partitionings and hierarchical decompositions of the multi-dimensional lattice data. The present invention also relates to the use of space and frequency view descriptions to provide an abstraction layer between stored/compressed data and multimedia applications; to provide a view description interface for audio-visual content description schemes; for communicating view requests and descriptions between client and server in image, video, and audio retrieval applications; to describe multi-dimensional shapes in terms of sets of views; to add annotations and meta-data to images, video and audio in order to specify information about locations, sizes and resolutions of regions, objects and segments in space, time, frequency and resolution, and to specify the construction of feature descriptors that utilize statistical measures computed from regions in space, time, frequency and resolution.

BACKGROUND OF THE INVENTION

Multimedia search, retrieval and filtering applications need a standard reference system to specify regions, locations and sizes along the dimensions of space, time, resolution, and frequency. For example, this requirement is being addressed by MPEG-7, which is standardizing the interface for multimedia content search and retrieval. The objective of MPEG-7 is to improve the ability by which audio-visual content is indexed, searched, browsed, filed and filtered in a large number of multimedia storage and retrieval applications.

The audio-visual search and filtering applications need to deal with the dimensions of space, time, resolution, and frequency explicitly, such as when referring to spatial regions of images, temporal units of video, low-resolution versions of images, or frequency bands of audio. The applications also need to be able to refer to regions and locations in space, time, resolution and frequency without concern for the underlying storage and compression formats for the image, video and audio data. The applications need this higher-level interface to insulate them from the specific details of the data bit-streams and view extraction methods. In order to enable this abstraction, a description scheme is needed for specifying location, size and division along the dimensions of space, time, frequency and resolution as they pertain to the image, video and audio data, and for relating the views of the data with the data storage formats.

Independent of the compression and storage formats, digital multimedia content such as images, video and audio has an inherent lattice structure. For example, image data consists of pixels which are samples on a 2-D spatial grid. Similarly, audio and video data consists of samples in time, or in space and time, respectively. Spatial and temporal views, such as spatial quadrants of an image or temporal segments of video, correspond to the data in parts of the lattice. Frequency views, such as low-resolution images, wavelet subbands, or temporal-frequency channels, correspond to segments of the data after having been transformed into the frequency domain. Together, the notion of segmentation in space and frequency permits the development of a general notion of views of lattice date as follows: a view is a region in multi-dimensional space (including time) and multi-dimensional frequency (including resolution) that has location and size. Since audiovisual applications need to deal with views all the time, a description scheme is needed to describe views.

Previously, methods have been developed for describing regions of images. The TIFF image format provides the aide to specify tiling of images in space, as described in the TIFF Revision 6.0 by the Adobe Developers Association (Jun. 23, 1992). In the TIFF image format, each tile corresponds to a rectangular region of the image. In another approach, the Flashpix image format provides the ability to specify tiling of images at a finite number of resolutions, as detailed by Eastman Kodak Company authors in "FlashPix Formal and Architecture White Paper" (Jun. 17, 1996). Each Flashpix tile corresponds to a rectangular region of the image at a particular resolution. More general tilings can have location and size in space and frequency as demonstrated in the space and frequency graph, as taught by J. R Smith and S. -F. Chang, in "Space and Frequency Adaptive Wavelet Packets", Proc. IFEP. Intern. Conf on Acoustics, Speech and Signal Proc., ICASSP-95, Detroit, Mich., (May 1995) and in "Joint Adaptive Space and Frequency Basis Selection", Proc. IEEE Intern. Conf on Image Processing, ICIP-97, Santa Barbara, Calif., (October 1997). In the space and frequency graph, each view element corresponds to a multi-dimensional rectangular region in space and frequency that corresponds to the data of the image belonging to a spatial region and a frequency range.

While these examples illustrate specific types of decompositions of image and video data, they do not provide a general system for describing views produced by decompositions in space and frequency. A system is needed in order to enable interoperability between image and video systems in dealing with a diversity of decompositions and views of the data

SUMMARY OF THE INVENTION

In accordance with the aforementioned needs, the present invention is directed towards a method for uniformly describing space and frequency views of multidimensional lattice data, including regions, tilings and hierarchical decompositions of image, video, audio content, and time series data in space, time, frequency and resolution. The space and frequency view description scheme provides a way to specify regions in space, time, frequency and resolution in term of space and frequency views. This allows specification of concepts such as "half resolution", "upper right quadrant" or "high pass band", such as when referring to views of an image. The space and frequency view description scheme also provides a way to index these view, which is important in applications of progressive retrieval in which a client application can send requests for views of images stored at a server in terms of an index value. The space and frequency view description scheme handles the details concerning the access and relationship of views with different resolutions, spatial locations and sizes.

The invention, by providing a uniform description scheme, provides an abstraction layer between image, video and audio description schemes and multimedia applications and the stored, compressed data, which then allows the data to be referenced and accessed in terms of space and frequency views. Furthermore, the invention provides for the creation and use of a view indexing system using a space and frequency graph (SFGraph) data structure. View requests and descriptions between client and server in retrieval applications can then be communicated using the inventive description scheme, and, multidimensional shapes can be described in terms of sets go of views. Moreover, attributes to objects, annotations, meta-data and descriptors that specify information about locations, sizes, and regions in space, time, frequency and resolution can be added using the invention; and the derivation of descriptors that utilize statistical measures computed from regions in space, time, frequency and resolution can be specified.

BRIEF DESCRIPTION OF THE DRAWINGS

The invention will now be described in detail with specific reference to the appended drawings wherein.

DETAILED DESCRIPTION OF A PREFERRED EMBODIMENT OF THE INVENTION

The space and frequency view description system and method provides a standard way to describe locations, sizes, views, tilings and hierarchical decompositions in space, time, resolution and frequency. The space and frequency view description system and method also provide an abstraction layer between the multimedia applications that need multi-resolution sub-region access to lattice data and/or data which is capable of being characterized as lattice data, including image, video and audio data and the storage and compression formats for the data (hereinafter collectively referred to as "lattice data"). The invention thereby eliminates the need for the multimedia applications and the other specific MPEG-7 description schemes (DSs) to be concerned with the underlying data representations and storage formats. Accordingly, a higher-level interface is provided in which the applications use the space and frequency view description scheme as a standard way of referring to space and frequency views. The space and frequency view description system and method correlate those views with the specific storage and compression schemes.

Figure 1:
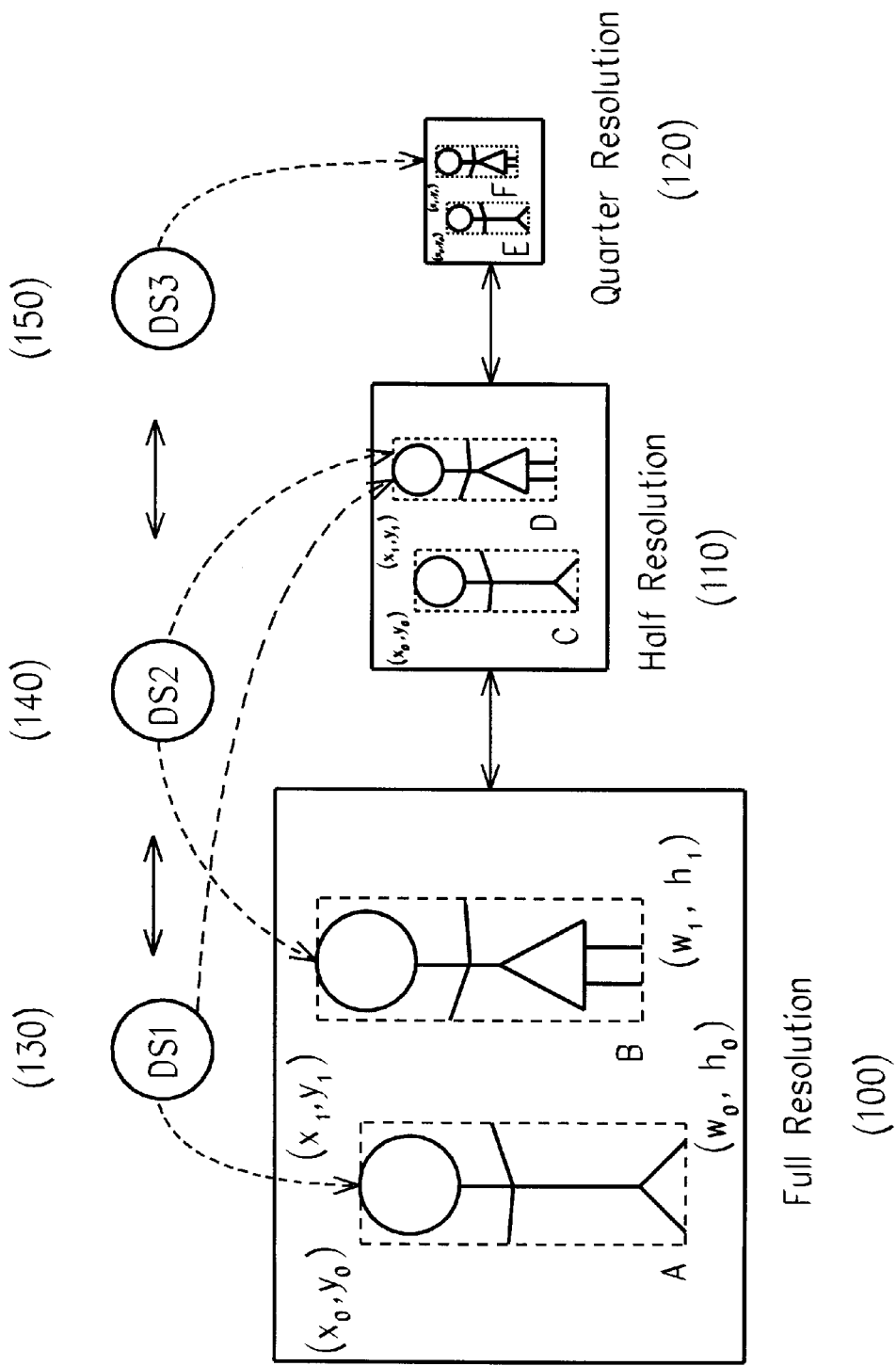
FIG. 1 illustrates how the space and frequency view description scheme provides a space and frequency view description interface for audio-visual content description schemes that refer to multi-resolution sub-regions of audio-visual data.

FIG. 1 illustrates the abstraction enabled by the space and frequency view description system and method for multimedia content description. Multimedia content description meta-data often refers to regions and objects within images, video and audio. For example, an image description scheme may refer to bounding rectangle regions in images and may supply annotations the describe the data within those regions. The description scheme may also specify how the regions relate, i.e., spatially, temporally, or semantically, to other regions. In general, a multimedia content description application may have multiple description schemes, i.e., DS1 (130), DS2 (140), and DS3 (150), that refer to regions of the data depicted at different resolutions, i.e., full resolution (100), half resolution (110), and quarter resolution (120), respectively. For example, 'A' and 'C' refer to the same region of the image but at different resolutions—full resolution (100) and half resolution (110). The space and frequency view description scheme helps to determine the relationship between views 'A' and 'B' since it parameterizes the specification of views or regions in terms of space and frequency components.

Figure 2:
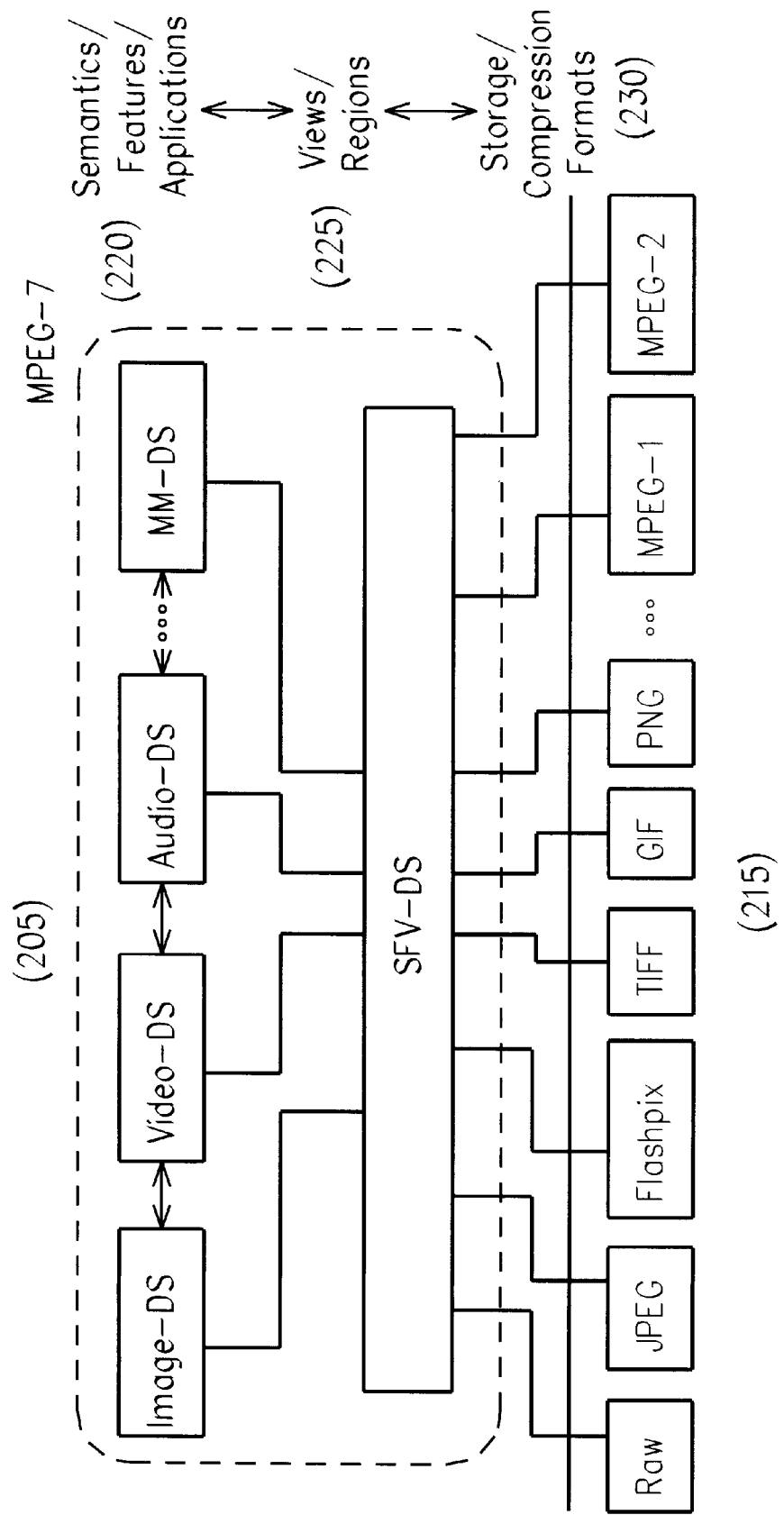
FIG. 2 schematically illustrates how the space and frequency view description scheme provides an abstraction layer between the multimedia applications and the storage and compression formats for the data.

FIG. 2 shows how the space and frequency view description scheme acts as an interface between different description schemes (DS) (205) within multimedia applications and as an interface (225) between the applications and description schemes (205) and the data storage formats (215). Many of the multimedia applications use DSs and Ds that refer to locations and regions of the data in space, time, frequency and resolution. An image-DS specifies objects that point to sets of spatial regions of an image. Similarly, a video-DS specifies events that correspond to sets of segmented temporal units of video. Other descriptors (D), potentially describe features of regions of images, or scenes of video, or segments of audio. The space and frequency view description scheme (225) provides a standard way of specifying the locations, regions and sizes in space, time, frequency and resolution that enables the DSs (205) to correlate with each other and with the stored data.

Since the multimedia data can be potentially be stored in a large variety of storage and compression formats, the applications (220) need to be insulated from the details of the storage and compression (230). For example, image data can be stored in raw pixel format, JPEG, Flashpix, Tiff, Gif, PNG, and many other formats (215). Video and audio similarly can be stored in many different formats, such as MPEG-1, MPEG-2, and so forth. The space and frequency view description scheme builds a view interface (225) on top of the storage formats that translates the references to multi-resolution subregion views in space and time into the appropriate references to and operations on the data streams of the storage and compression formats.

In order to provide a common interface for specifying location, size, and regions in space, time, frequency and resolution, the space and frequency view description scheme defines the following view elements: Space views, Frequency views, Resolution views, and Space plus Frequency views (SFViews). In order to describe partitionings in space and frequency, the inventive view description scheme defines the view set elements: SFTiling and SFPartitioning. In order to describe hierarchical decompositions in space and frequency, the space and frequency view description scheme defines the following elements: SFPyramid, SFTree and SFGraph.

Figure 3:
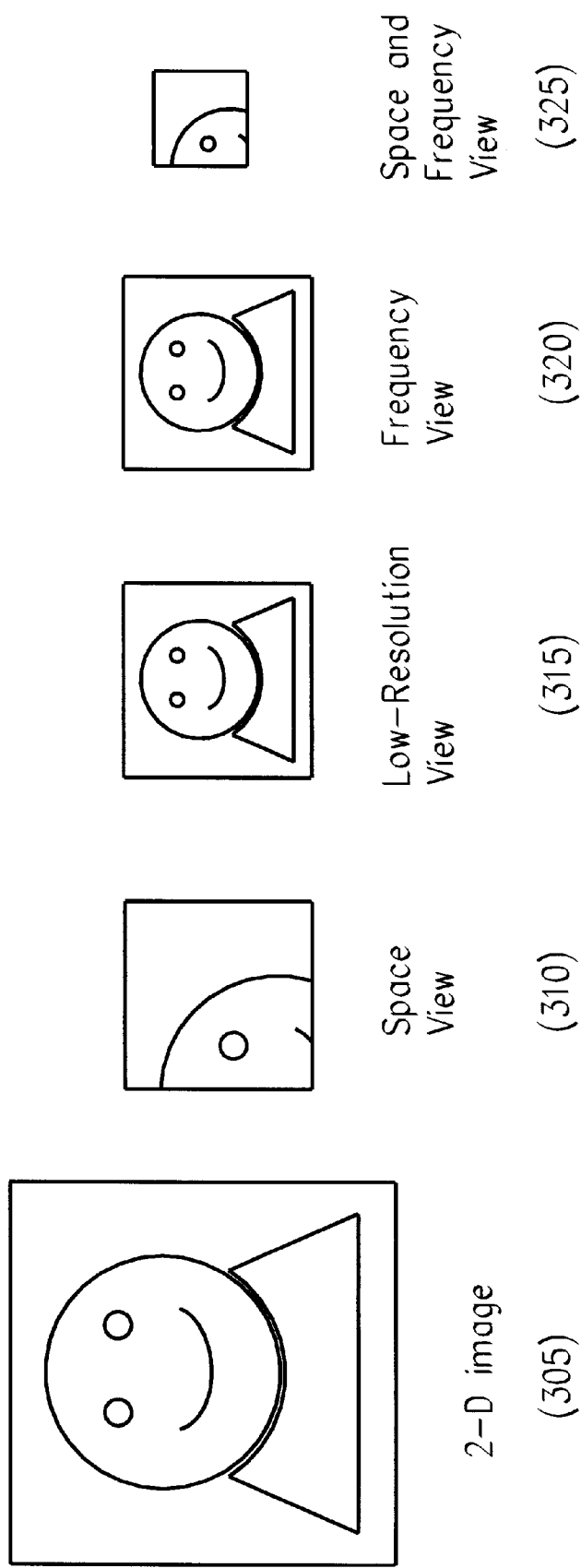
FIG. 3 shows examples of space and frequency views for a 2-D image including a full resolution image, space view, a low-resolution view, a frequency view, and a space and frequency view.

FIG. 3 shows how, in the space and frequency view description scheme, the notion of the regions in space, time, resolution and frequency are captured in views. In general, a view is a region which has location and size. The several elements are built up in order to address the notions of views in space, resolution, frequency, and space and frequency. A space view (310) addresses the notion of a region in space or time. In images, a space view corresponds to a rectangular spatial region of the image. In video, a space view corresponds to a temporal unit of the video, or to a spatial region within a temporal segment. A space view is defined as a rectangular region of arbitrary size and location in multi-dimensional space (includes time).

Since very often in multimedia applications, the data is analyzed, indexed and handled at different resolutions, the notion of a region in space and resolution (315) must be addressed, such that a spatial region can be defined that is specific to a particular resolution. A resolution view is defined as a rectangular region of arbitrary size and location in multi-dimensional space that exists at a specific resolution.

In many cases, the views can exist at a range of resolutions, or more generally, as a range in frequency if the notion of frequency (i.e, low-frequency) is extended to include resolution. In this way, a view that is a region in frequency (320) is defined as a frequency view which is a rectangular region of arbitrary size and location in multi-dimensional frequency.

Finally, views can simultaneously occupy regions in space and frequency (325). A space and frequency view, or an SFView, is therefore defined as a rectangular region of arbitrary size and location in multi-dimensional space and frequency.

Figure 4:
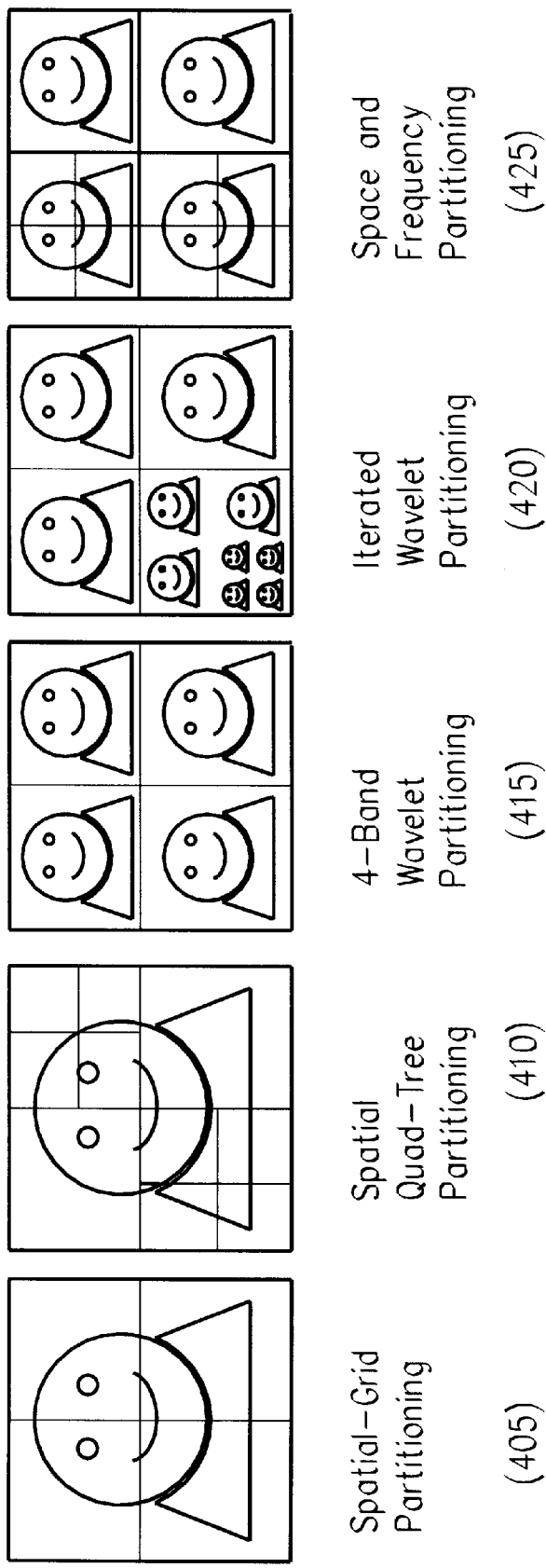
FIG. 4 provides illustration of examples of space and frequency partitionings for a 2-D lattice image data as follows: spatial-grid partitioning, spatial quad-tree partitioning, 4-band wavelet partitioning iterated wavelet partitioning, space and frequency partitioning.

FIG. 4 shows the collection of views that form partitionings of the data. The multimedia applications also need to be able to specify sets of views in order to describe complex objects and shapes, or specify decompositions of the data in space and frequency. In order to address this notion of partitionings, the elements of SFTiling and SFPartitioning have been developed. An SFTiling corresponds to any set of views that do not overlap. An SFTiling does not need to completely cover the space; and is, therefore, defined as a non-redundant set of views, where redundancy is determined by the intersection of the views in space and frequency.

In many cases, an SFTiling can be complete, that is, its set of views can completely cover the space,. When that occurs, it is referred to as an SFPartitioning An SFPartitioning is distinguished from an SF-Tiling, since an SFTiling does not cover the multi-dimensional space in space or frequency. SFPartitionings can be generated by decomposing the data in space or frequency. FIG. 405 shows a spatial-grid partitioning; FIG. 410, a spatial quad-tree partitioning; FIG. 415, a 4-band wavelet partitioning, FIG. 420, an iterated partitioning; and FIG. 425, a space and frequency partitioning An SFPartitioning is, therefore, defined as an SFTiling that completely covers the multi-dimensional space in space and frequency.

Together, the completeness and non-redundancy constrains imply that the set of SFViews provides a non-redundant and complete covering of the multi-dimensional space in space and frequency.

Figure 5:
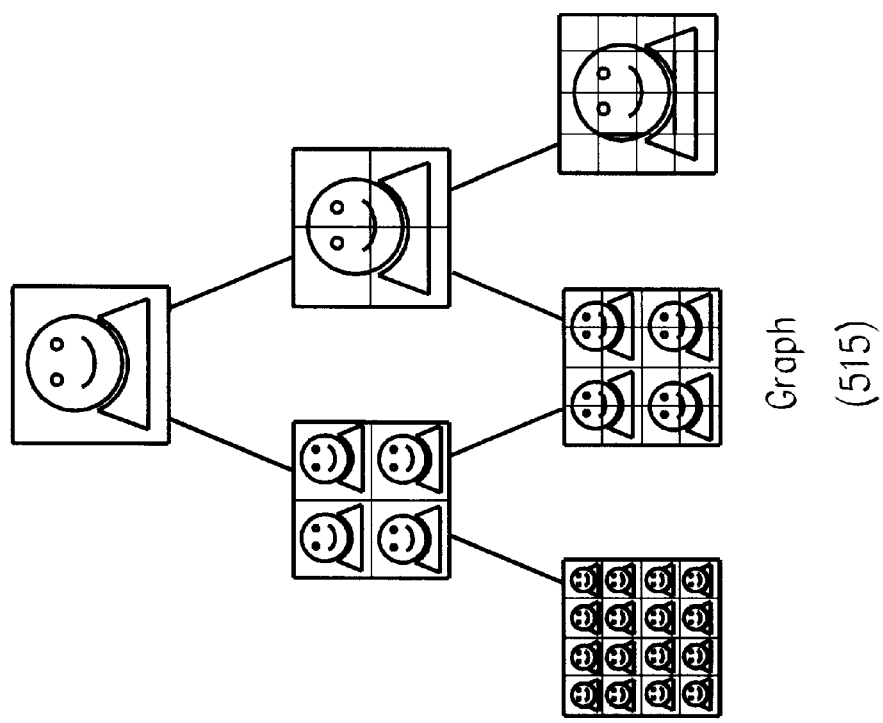
FIG. 5 depicts examples of space and frequency hierarchical decompositions for 2-D lattice image data as follows: multi-resolution pyramid, spatial quad-tree, space and frequency graph.
Figure 5:
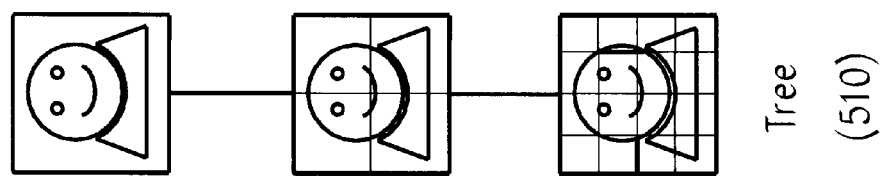
Figure 5:
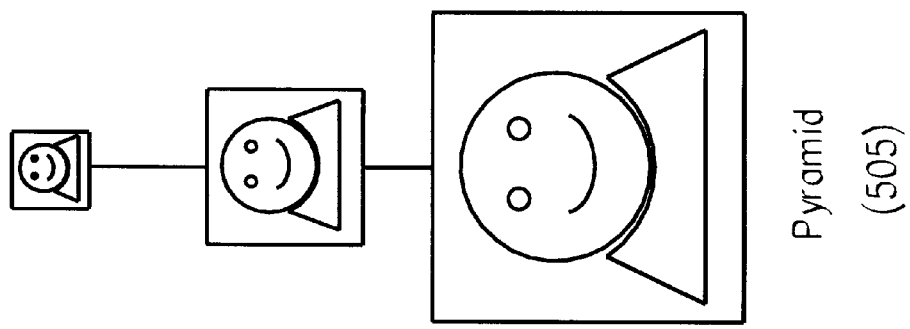

FIG. 5 shows hierarchical decompositions that can be used to index views of the data. The decompositions of SFPyramid, SFTree and SFGraph are built on top of an abstract element, referred to as the SFHierarchical decomposition. An SFHierarchical decomposition is a hierarchy of SFViews, possibly collected into SFTilings or SFPartitionings, in which there is a processing dependency among the SFViews in the hierarchy.

One organization of SFViews which is often used in multimedia applications is based on a multi-resolution pyramid (505). A multi-resolution pyramid contains several versions of the data at different resolutions. This type of pyramid is used, for example, in the JPEG storage format for storing images at multiple resolutions, where each of the three levels of the pyramid contains a tiling with a se view and only the bottom tiling, at full-resolution, is complete. Under the present invention, an SFPyramid is defined as a hierarchy of SFViews with one SFView at each level, in which there is a processing dependency among the SFViews in the hierarchy. The SFPyramid can describe any arbitrary multi-resolution decomposition of any number of levels of the image or video data, including the case of the JPEG pyramid.

Another type of organization of SFViews is based on tree-decompositions. In a spatial quad-tree decomposition (510), a 2-D image is iteratively decomposed in space as taught by H. Samet, "The Quadtree and Related Hierarchical Data Structures", ACM Computing Surveys, 1984. Images can also be decomposed in frequency using a wavelet packet-tree. A SFTree can describe any arbitrary space and frequency tree-based decomposition of the image or video data including the spatial quad-trees or wavelet packet trees. The SFTree is defined as a hierarchy of SFViews with one SFPartitioning at each level, in which there is a processing dependency among the SFViews in the hierarchy.

A graph can also be used to organize the SFViews in which the data is decomposed symmetrically in space and frequency (515). The SFGraph provides a way to index dyadic SFViews. In the SFGraph, the data is iteratively decomposed in space and frequency. A SFGraph is defined as a hierarchy of SFViews with one or more SFPartitioning at each level, in which there are multiple processing dependencies among the SFViews in the hierarchy.

Figure 6:
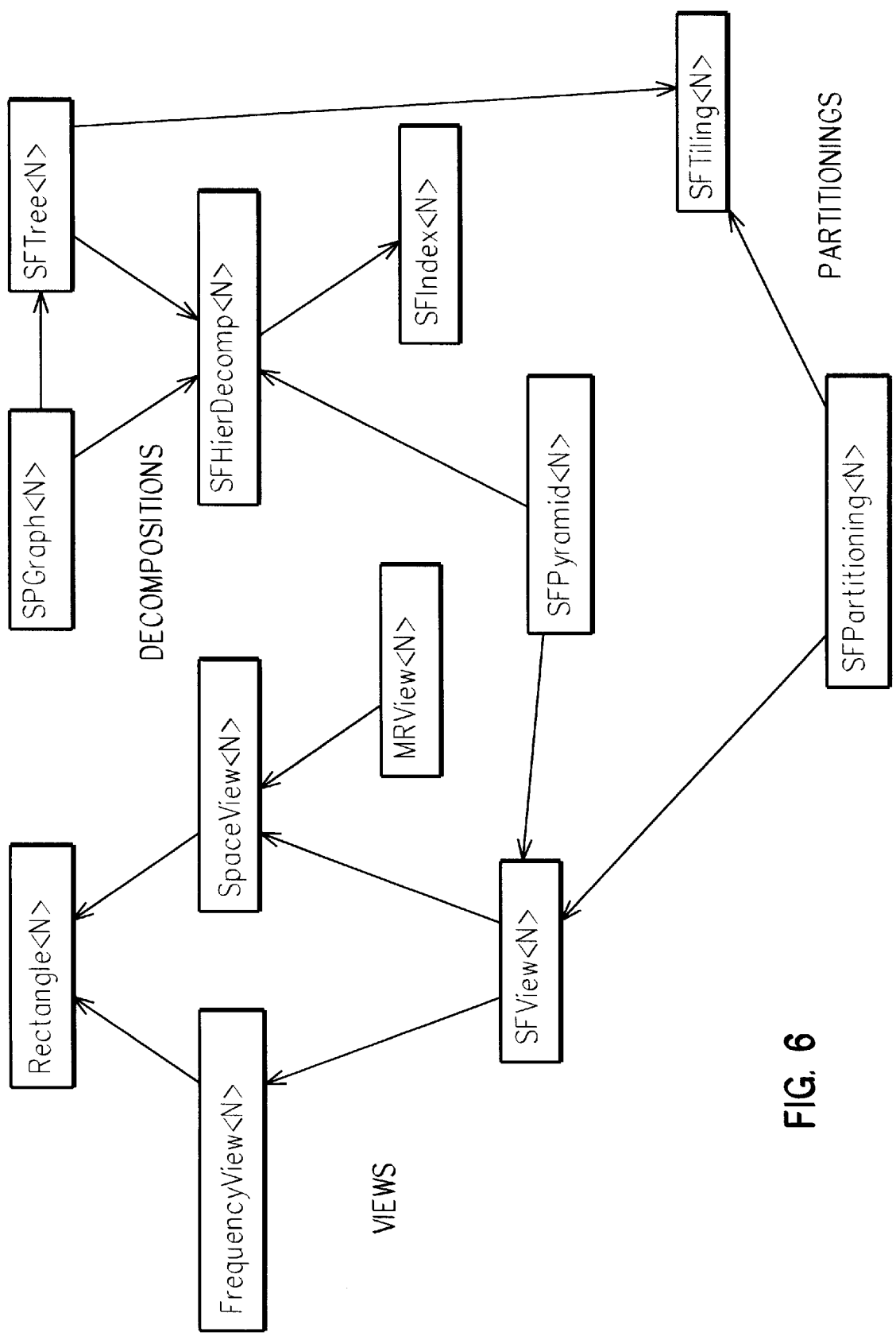
FIG. 6 illustrates the relationship between the descriptors in an implementation of the 1 space and frequency view description scheme.

In order implement the space and frequency view description scheme, an object-oriented relationship of the space and frequency descriptor classes can be defined to allow creation of C++or Java code. FIG. 6 shows the is-A and has-A relationships between the classes in the space and frequency view description scheme, where is-A is indicated by the closed-head arrow and has-A is indicated by the open-head arrow. Together, these classes and their dependencies create the space and frequency view description scheme.

Figure 7:
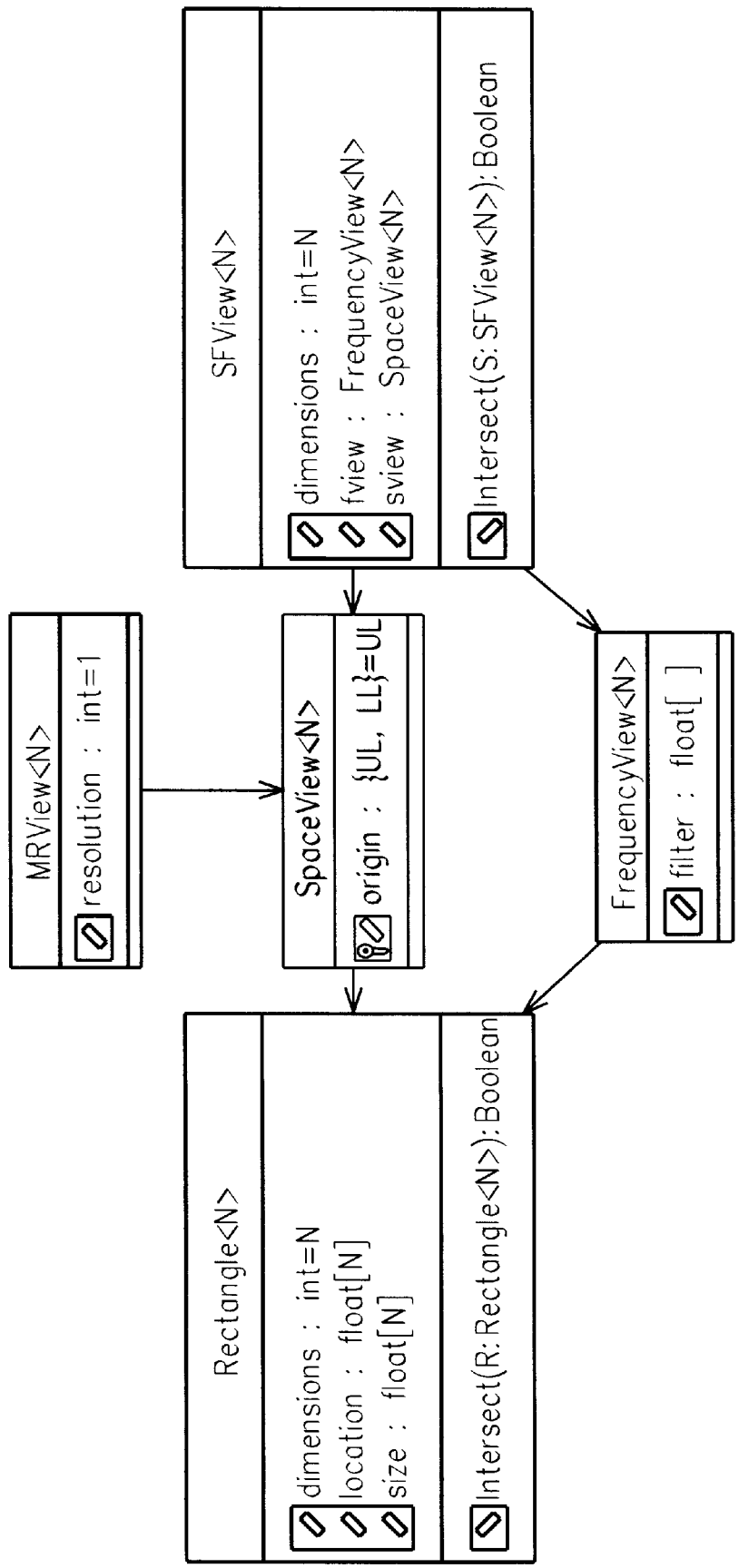
FIG. 7 provides a class diagram for an implementation of an N-dimensional space and frequency view descriptors.

As shown in FIG. 7, the space and frequency view description scheme defines several object classes for specie regions in multi-dimensional rectangular region in space and frequency. Views are meant to be general in the sense that they can have zero size, or fill size in space or frequency. This allows them to be used to describe locations, durations, sizes and regions in space and frequency. Each view is defined in terms of two N-dimensional rectangles, one in N-dimensional space, and one in N dimensional frequency, where N is the dimensionality of the original data, where its dimensionality can be derived from the specific media type, for example, for audio, N=1, for images, N=2, and for video, N=3.

A base Rectangle<N>class defines N-dimensional rectangles with arbitrary location and size. The Rectangle<N>'s are normalized with respect to the size of the space to fall in the range (0, 1). The size value indicates the relative size of the rectangle with respect to the size of the space. The location value indicates the relative location of the Rectangle<N>with respect to the origin. The Rectangle<N class also has an intersect(Rectangle<N>) function, which measures whether the Rectangle<N>intersects with another supplied Rectangle<N>.

The SpaceView<N>class is defined as a Rectangle<N>in space A data member called origin defines the origin of the coordinate system for the Rectangle<N>'s. The MRView<N>class is defined as a SpaceView<N>which also has a data member called resolution. The resolution indicates the specific resolution of the view, where the view's scale is given by $\frac{1}{2}^{(resolution-1)}$. A FrequencyView<N>class is defined as a Rectangle<N>in frequency. A FrequencyView<N>has an optional data member called filter which gives the taps of the filter used to segment the Rectangles<N >in frequency.

The SFView<N>consists of a SpaceView<N>and a FrequencyView<N>. The SFView<N>class has a function called intersect(SFView<N>), which measures the intersection of the SFView<N>with another supplied SFView<N>, where intersection is measured by the intersection of both the SpaceView<N>'s and FrequencyView<N>'s.

Figure 8:
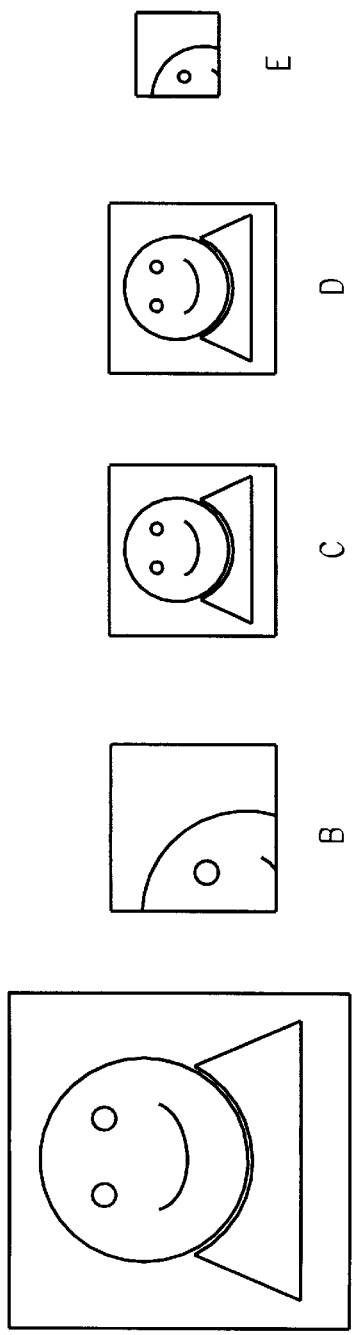
FIG. 8 schematically and graphically illustrates examples of the specification of the space and frequency views of 2-D lattice image data as follows: a full resolution image of the 2-D lattice image data, a space view, a low-resolution view, a frequency view, and a space and frequency view, FIG. 9 provides class diagrams for an implementation of an N-dimensional space and frequency partitioning descriptor.

FIG. 8 shows how the different types of views can be specified using the space and frequency view classes. The five different types of views (A, B, C, D, E) can all be specified as SFViews by giving the parameters of the space and frequency rectangles (column 820). The view 'A' can also be specified as a space view by giving only its space rectangle parameters (column 805), since it occupies the full frequency space. Similarly, view 'A' can also be specified as a resolution view by giving its space rectangle parameters and a '1' to denote full resolution for the resolution parameter (column 810). The space view 'B' can be specified as a space view by giving its spatial rectangle parameters (column 805). The resolution view 'C' can be specified by giving its space and resolution parameters (column 810), or as a frequency view by giving its frequency rectangle parameters (column 815). The frequency view 'D' can be specified by giving its frequency rectangle parameters (column 820).

Figure 9:
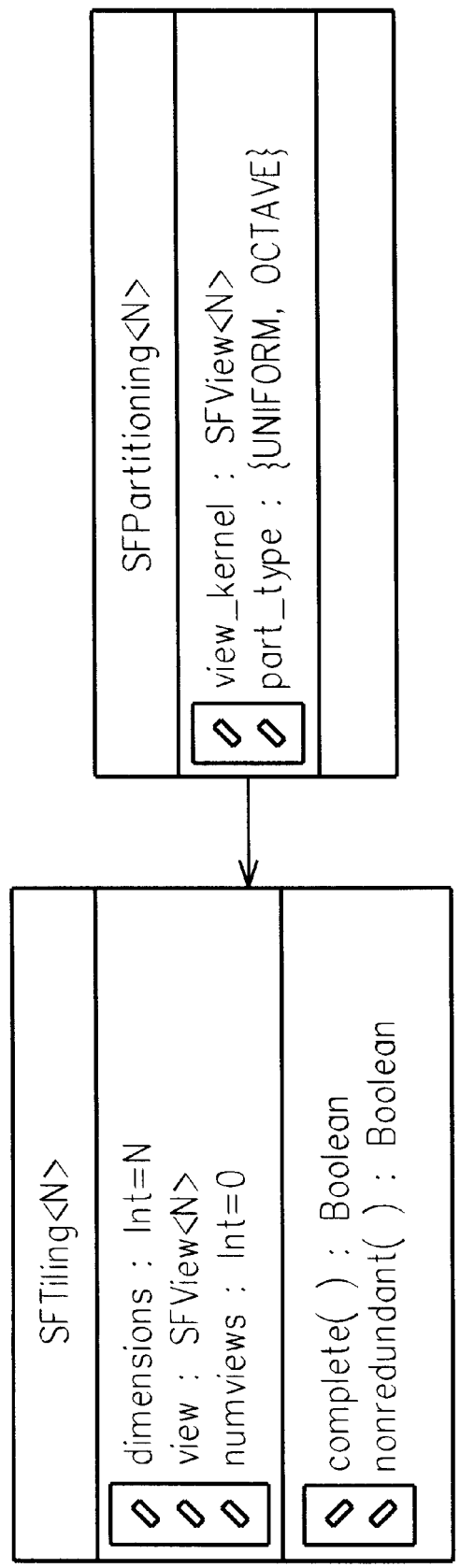

FIG. 9 shows how the space and frequency view description scheme defines object classes for specifying partitionings in multi-dimensional space and frequency. The SFTiling<N>descriptor defines a set of SFViews<N>. The number of SFViews<N>in a SFTiling<N object is given by numviews. The set of SFViews<N>can be complete or incomplete, but is necessarily non-redundant. The SFTiling class has member functions that tests the SFView<N>set for completeness and non-redundancy. The set of SFView<N>is complete if and only if the SFView<N>form a complete covering in N-dimensional space and N-dimensional frequency. The set of SFView<N>is non-redundant if and only if the views do not intersect with each other.

The SFPartitioning class defines a set of complete SFViews<N>. Since the set of SFViews<N>is necessarily non-redundant and complete, an SFPartitioning<N object can be constructed from a single SFView<N>kernel and a partitioning type. For example, a uniform partitioning would cover the space with SFView<N>kernel placed side-by-side. An octave partitioning would scale the SFView<N kernels with decreasing frequency to generate a wavelet covering in frequency.

Figure 10:
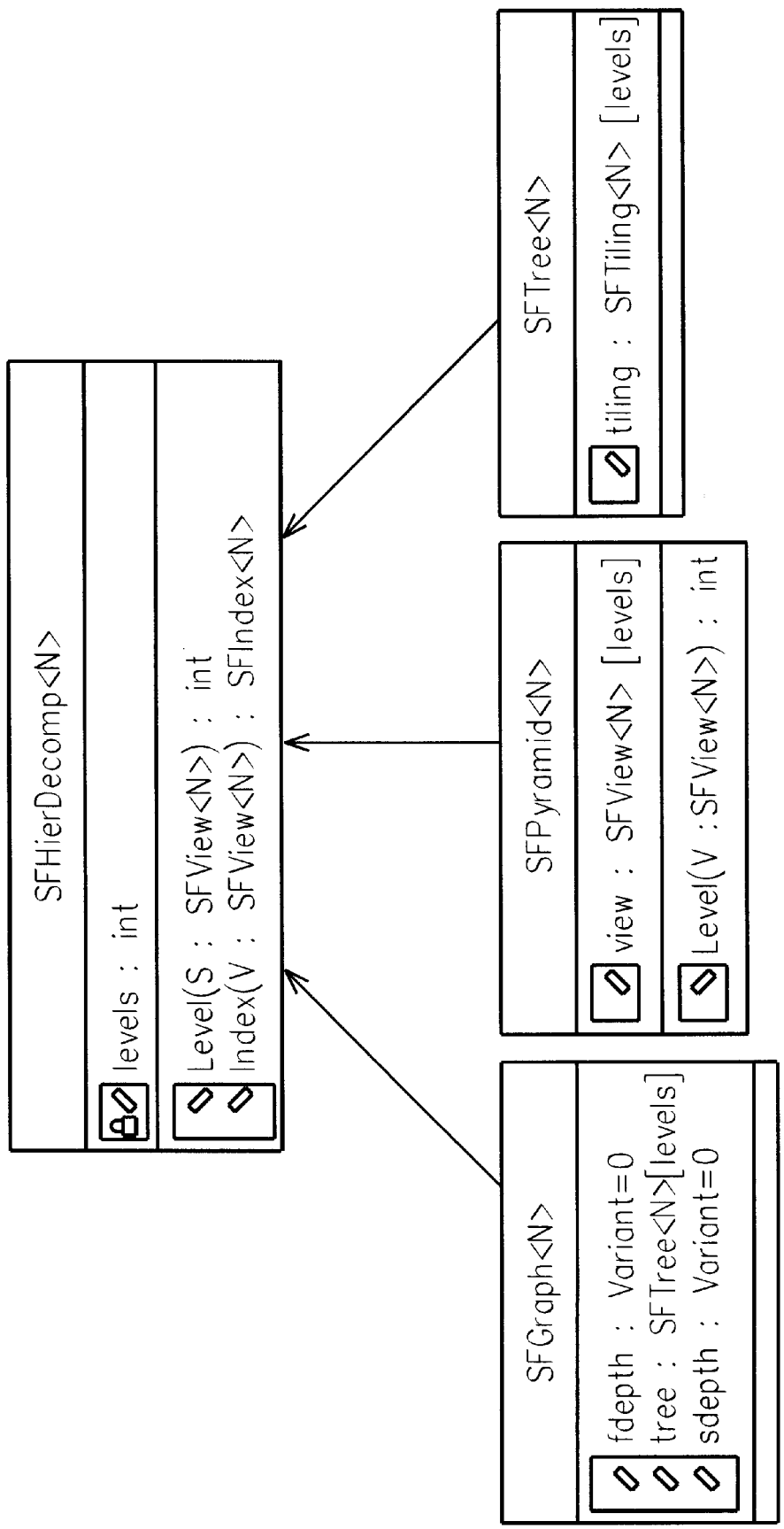
FIG. 10 provides the class diagrams for an implementation of an N-dimensional space and frequency hierarchical decomposition descriptor and a space and frequency pyramid descriptor.

FIG. 10 shows how the space and frequency view description scheme defines object classes for specifying hierarchical decompositions in multi-dimensional space and frequency The SFHierarchical decomposition class forms a base class for defining classes for SFPyramids, SFTrees and SFGraphs. The SFPyramid<N>class defines a set of SFViews<N>that are organized into a pyramid and are stored as an array. The index of each SFView<N>in the array gives its level in the SFPyramid<N>. The SFTree<N>class defines a set of SFViews<N>that are organized into a array of SFTiling<N>. The index of each SFTiling<N>in the array gives its level in the SFHierarchical Decomposition<N>. Finally, the SFGraph<N>defines a set of SFViews<N>that are organized into multiple SFTilings<N>at each level.

Figure 11A:
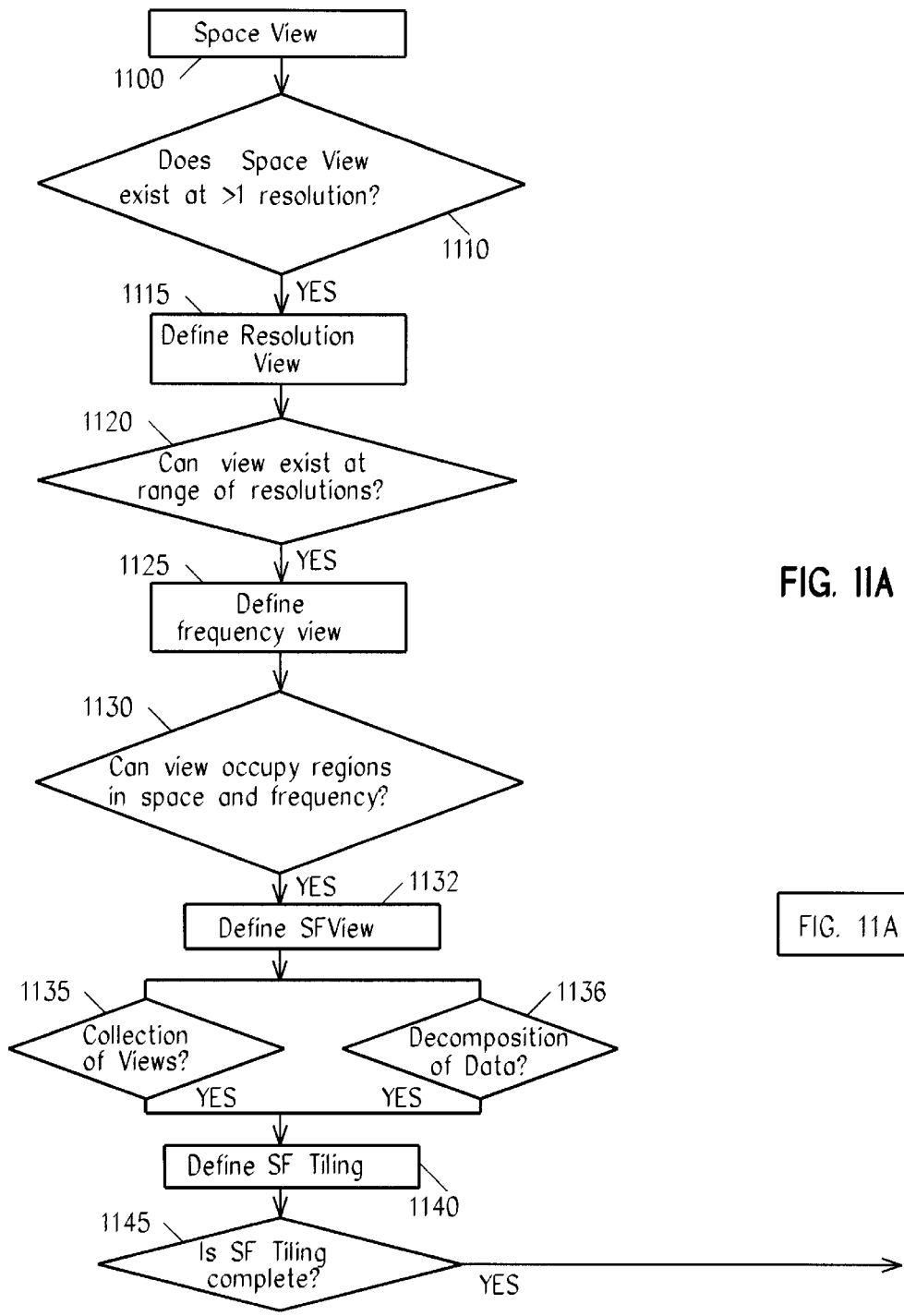
FIG. 11 provides a representative process flow for one implementation of the invention.
Figure 11B:
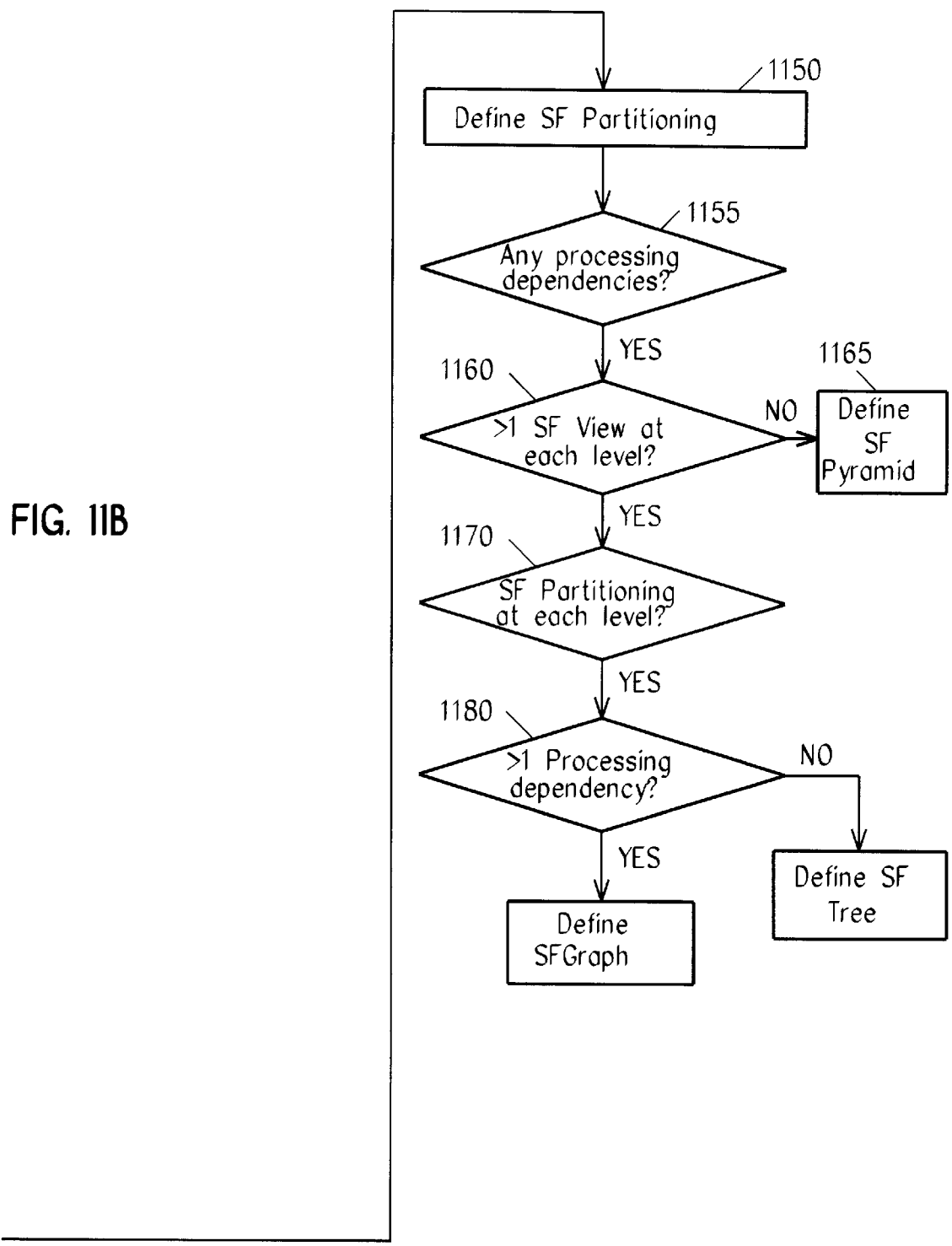

The process for describing multidimensional lattice data will now be described with reference to FIG. 11. It is to be understood that the order of processing is not absolute and could be altered without materially affecting the resulting view description. First, the data would be evaluated for applicability of (or characterization using) a space view, at step 1100. It is next determined, at step 1110, if the space view exists at more than one resolution. If so, at 1115, a resolution view is defined for the data. If, as determined at 1120, the views can exist at a range of resolutions, a frequency view will be defined for the data, at 1125. Finally, if the view can simultaneously occupy regions in space and frequency, as determined at decision box 1130, then a space and frequency view at 1132 (SFView) is generated to describe the data. For data which comprise a collection of views, as determined at 1135, or which include decompositions of the data in space and frequency, as determined at 1136, it is necessary to specify sets of views in order to described the complex objects or the decompositions of the data in space and frequency. Therefore, an SFTiling is developed at 1140 for a collection of views that forms some partitioning of the data. Upon development of the SFTiling, it is next determined if the SFTiling is complete, such that its set of views completely covers the space. If so, as determined at 1145, then the SFTiling distinction is refined to provide an SFPartitioning for the data at 1150. In further characterizing the data, it is next determined if there are any processing dependencies among the views, as shown in decision box 1155. If there are processing dependencies, then some hierarchical decomposition of the views, possibly represented as views or as flings or partitionings, is needed to appropriately describe the data. Therefore, after a determination at 1155 that there are processing dependencies, if there is only one SFView at each level, as determined at 1160, then an SFPyramid can be developed at 1165. If there is an SFPartitioning at each level, as determined at 1170, then an SFTree is defined for the data at 1175. Finally, if there is an SFPartitioning at each level, from 1170, and it is also determined at 1180 that there are multiple processing dependencies among the SFViews in the hierarchy, then an SFGraph is created at 1185 to characterize and index the SFViews and their dependencies.

Figure 12:
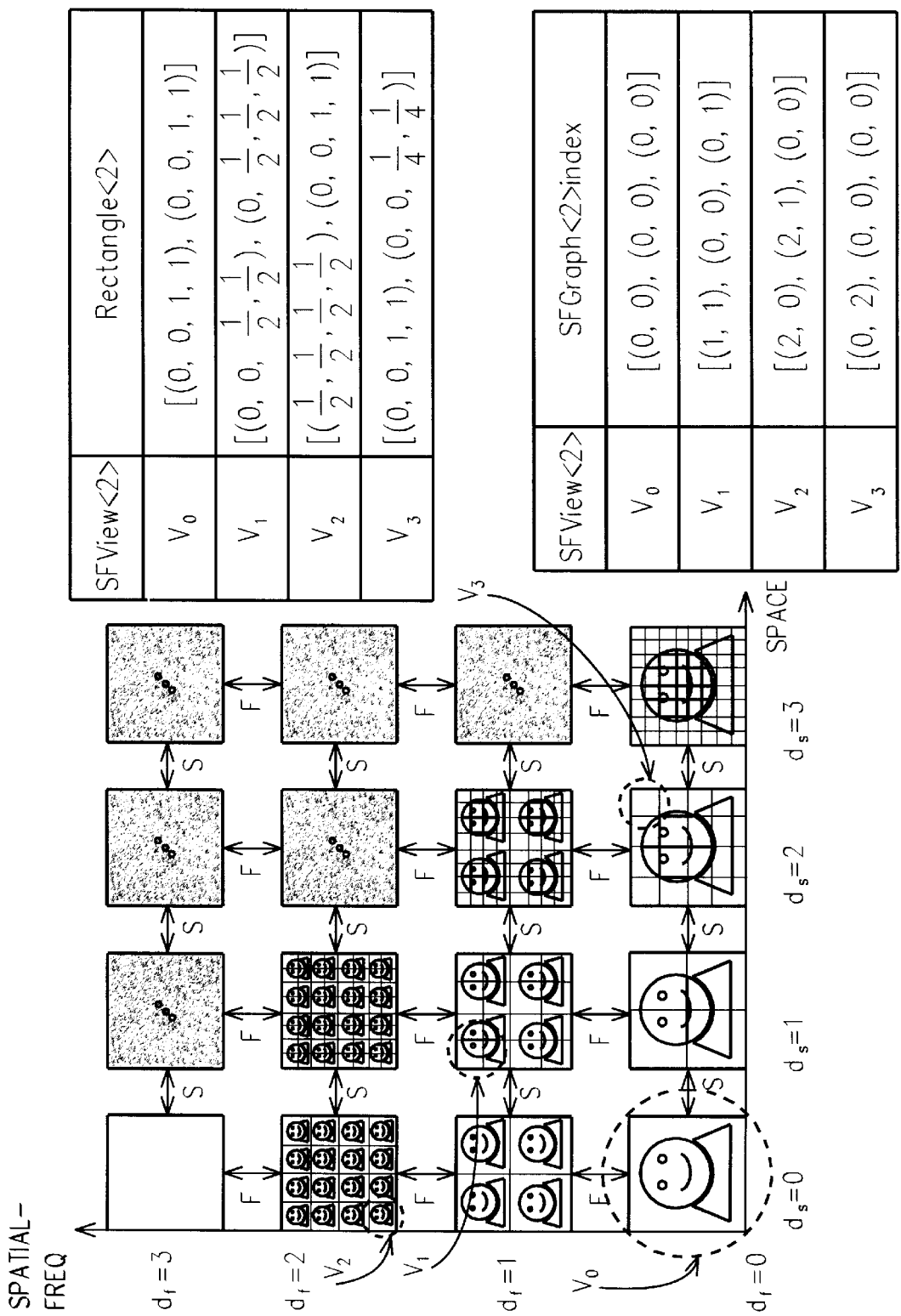
FIG. 12 illustrates a space and frequency graph index structure which provides a mechanism for indexing space and frequency views that are dyadic in location and size, wherein each view has an index value according to its position in the space and frequency graph.

FIG. 12 shows how the space and frequency views can be indexed using a space and frequency graph. In many applications the image, video and audio data are decomposed dyadically in space or time. That is, the data is partitioned along the boundaries that fall along powers of two. For example, the spatial quad-tree decomposition is dyadic in space. The wavelet transform falls only along dyadic boundaries in frequency. Given this observation, it is useful to provide an index system for specifying views that correspond to dyadic regions in space and frequency. The SFGraph provides a way to organize and index the dyadic space and frequency views.

FIG. 12 shows that each N-dimensional dyadic view in space and frequency has a position in the SFGraph. As a result, each view (V0, V1, V2, V3) can be specified not only by its SFView rectangles, but also by an index value that gives its position. The SFGraph index values can be assigned as follows: each SFView as a depth in space and frequency, belongs to an SFPartitioning, and has a position in that SFPartitioning. Within each SFPartitioning, the SFView has a location along each dimension in space and frequency. For the case of 2-D data, the 6-D index value is given by the space depth (sx, sy), frequency depth (fx, fy) and position (px, py), as shown in the table below.

| SFView<2> | Rectangle<2> in space and frequency | SFGraph<2> index [(sx, sy), (fk, fy), (px, py)] |
|---|---|---|
| $V_0$ | [(0, 0, 1, 1), (0, 0, 1, 1)] | [(0, 0), (0, 0), (0, 0)] |
| $V_1$ | [(0, 0, ½, ½), (0, ½, ½, ½)] | [(1, 1), (0, 0), (0, 1)] |
| $V_2$ | [(½, ½, ½, ½), (0, 0, 1, 1)] | [(2, 0), (2, 1), (0, 0)] |
| $V_3$ | [0, 0, 1, 1), (0, 0, ¼, ¼)] | [(0, 2), (0, 0), (0, 0)] |

Figure 13:
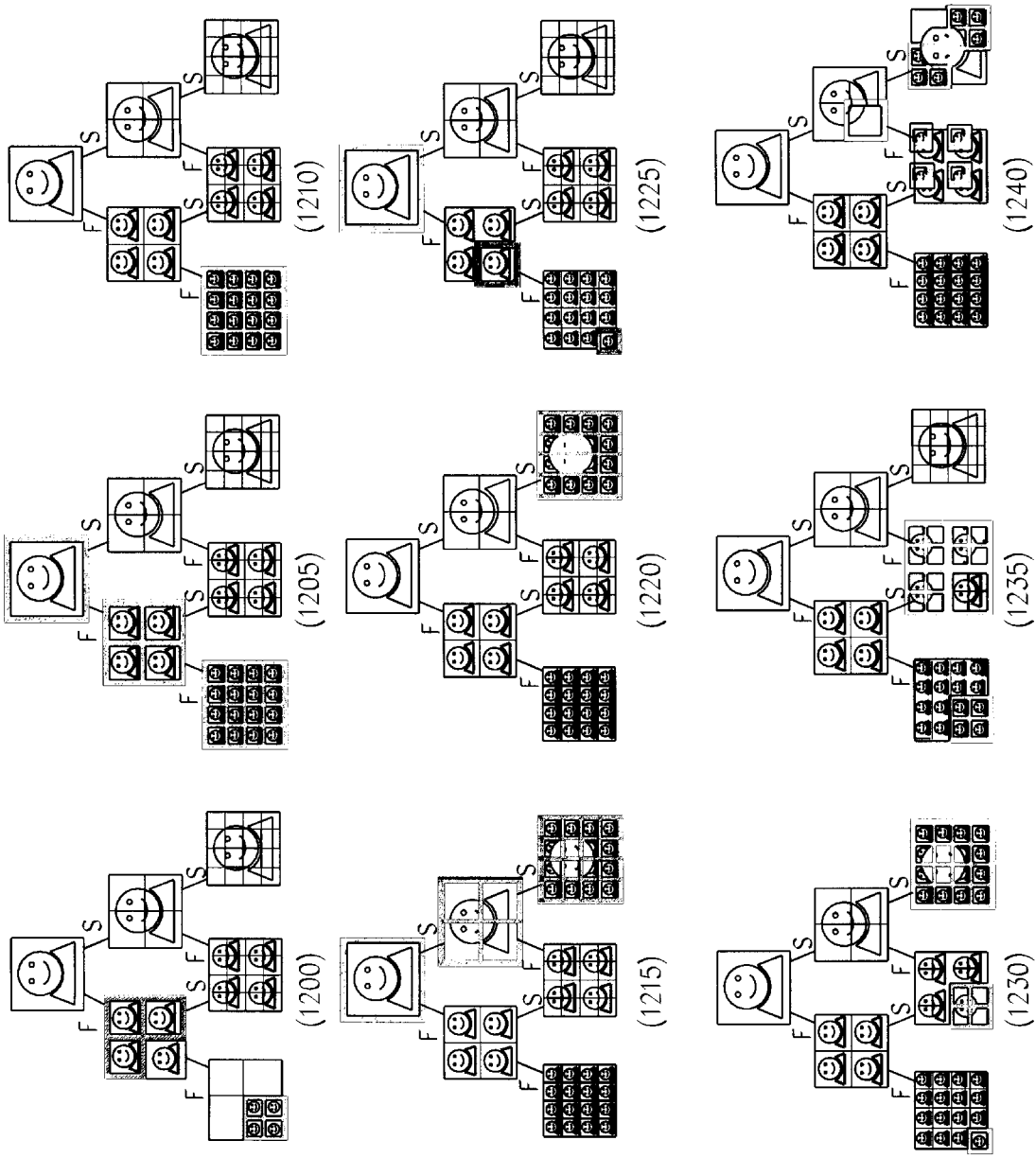
FIG. 13 depicts different hierarchical decompositions of 2-D images into sets of views that can be described and indexed using the space and frequency graph.

FIG. 13 shows that the SFGraph indexing scheme can be applied to many different dyadic decompositions of the data. FIG. 1200 shows the views generated by a dyadic wavelet transformation; FIG. 1205 shows the views generated by a dyadic spatial quad-tree decomposition; FIG. 1210 shows the views generated by a dyadic spatial grid, FIG. 1215 shows the views generated by a dyadic wavelet packet transformation; FIG. 1220 shows the views generated by a dyadic uniform subband decomposition; FIG. 1225 shows the views generated by a multi-resolution pyramid; FIG. 1230 shows the views generated by a Flashpix decomposition, FIG. 1235 shows the views generated by a dyadic fled-wavelet decomposition; and, FIG. 1240 shows the views generated by an arbitrary dyadic space and frequency graph decomposition.

Figure 14:
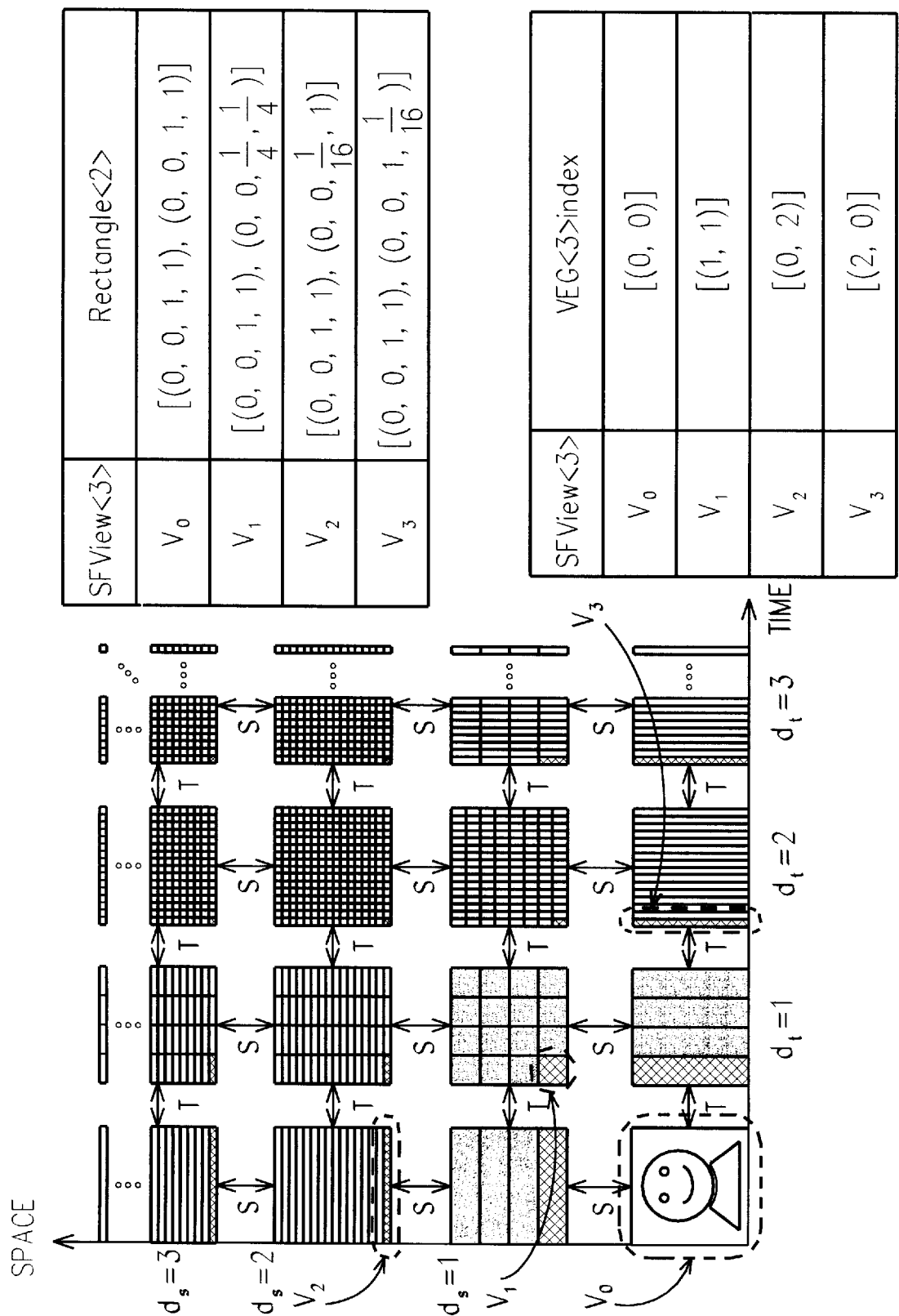
FIG. 14 is a video view element graph index structure which indexes views of video data with different resolutions in space and time.

FIG. 14 shows how the SFViews can be indexed for video applications using a video view element graph. In video applications, it is useful to de-couple spatial-resolution and temporal-resolution and organize the SFViews into a video view element graph hierarchical decomposition. As illustrated in FIG. 14, each video view (V0, V1, V2, V3) corresponds to a view of the video sequence at a particular spatial- and temporal-resolution Each video view can be assigned an index value on the basis of its location in the video view element graph (VEG). In this case, each SFView has a depth in spatial- and temporal-resolution, and can be indexed by the 2-tuple. For example, SFViews (V0, V1, V2, V3) depicted in FIG. 14 can be assigned view element graph (VEG) index values as follows:

| SFView<3> | Rectangle<3> in space and frequency | VEG<3> index |
|---|---|---|
| $V_0$ | [(0, 0, 1, 1), (0, 0, 1, 1)] | [(0, 0)] |
| $V_1$ | [(0, 0, 1, 1), (0, 0, ¼, ¼)] | [(1, 1)] |
| $V_2$ | [(0, 0, 1, 1), (0, 0, ¹⁄₁₆, 1)] | [(0, 2)] |
| $V_3$ | [(0, 0, 1, 1), (0, 0, ¹⁄₁₆, 1)] | [(2, 0)] |

Figure 15:
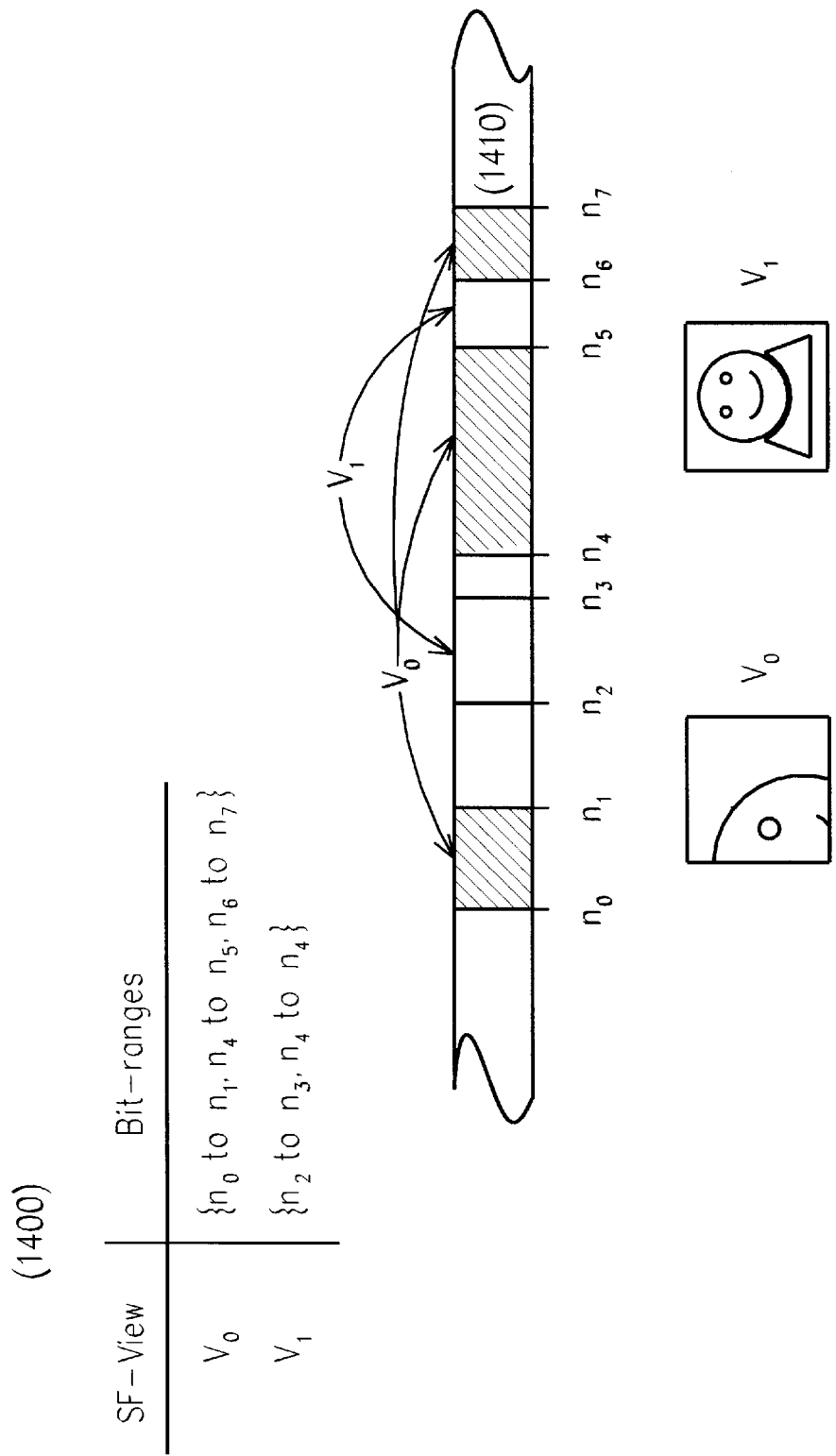
FIG. 15 depicts how the space and frequency view description scheme provides an interface between the space and frequency views and bit-ranges in the stored, compressed data stream.

FIG. 15 shows how the space and frequency view description scheme can provide an abstraction layer between image, video and audio description schemes (DSs) and the stored, compressed data that allows the data to be referenced and accessed in terms of space and frequency views. Since the multimedia data can potentially be stored in a large variety of storage and compression formats, the applications need to be insulated from the details of the storage and compression.

The space and frequency view description scheme builds a view interface on top of the storage formats that can translate the references of multi-resolution sub-region views in space and time into the appropriate bit-ranges and operations on the data streams. Each view (i.e., V0, V1) can be assigned a list of bit-ranges, as shown at 1400, which represents the data needed from the stored and compressed stream (1410) in order to extract the view. For example, view V1 can be accessed by accessing two segments of data from the bit-stream. The view to bit-stream translation table (1400) can also potentially store a description of the processing function that is needed in order to generate the referenced view by processing the extracted bit-stream data (1410).

The space and frequency view description system and method are extensible in that additional dimensions other than space and frequency can be accommodated, such as bit-depth, spectral bands and color channels. For example, the bit-depth dimension consists of sequences of bits. The space and frequency parameters can specify views along this bit-depth dimension, such as regions or ranges of bit-planes. Similarly, the space and frequency parameters can specify views across multiple bands or channels of data, such as across the three RGB color channels for images, or many spectral bands of satellite image data. For example, a space and frequency view can specify a portion of satellite image data that corresponds to a range of spectral frequencies.

One example of implementation of the invention is for client-server image retrieval. The space and frequency view description scheme can be used in communicating the requests for multi-resolution sub-region views of image and video data between a client and server in progressive retrieval applications (See: e.g., J. R. Smith, V. Castelli and C.-S. Li "Adaptive Storage and Retrieval of Large Compressed Images", Proc. SPIE/IS&T Storage and Retrieval for Image and Video Databases VII, San Jose, Calif., January, 1999;, the aforementioned Smith and Chang article from the ICIP-97; A. S. Poulakidas, A. Srinivasan, O. Egecioglu, O. Iharra, T. Yang, "A Compact Storage Scheme for Fast Wavelet-Based Subregion Retrieval", Proc. Computing and Combinatorics Conference (COCOON), 1997; and T. Barclay, R Eberl, J. Gray, J. Nordlinger, G. Raghavendran, D. Slutz, G. Smith, P. Smoot, "Microsoft Terraserver", June, 1998.) For example, the client can send the requests for different multi-resolution sub-region views to the server. The server can respond by retrieving the views from storage and transmitting the results to the client. The view requests can be represented in the form of SFViews to provide a uniform, standard interface for specifying the space, time, frequency and resolution parameters of the views. The data at the server can also be represented using SFPartitionings or SFHierarchical decompositions to provide a standard way for accessing the views.

The inventive system and method can be used for the specification of regions, locations and sizes, as well. Many descriptors and description schemes need to specify regions in space, time, frequency and resolution. For example, in the MPEG-7 standardization effort, the proposed image description scheme defines image objects as regions in the 2-D image space. The description scheme adds descriptor attributes to the objects and organizes them into a hierarchy. The minimum bounding rectangles of these objects can be represented in a standard way by using SFViews. In addition, the multi-resolution capability of the SFV-DS allows the objects to be defined at specific or multiple resolutions.

Figure 16:
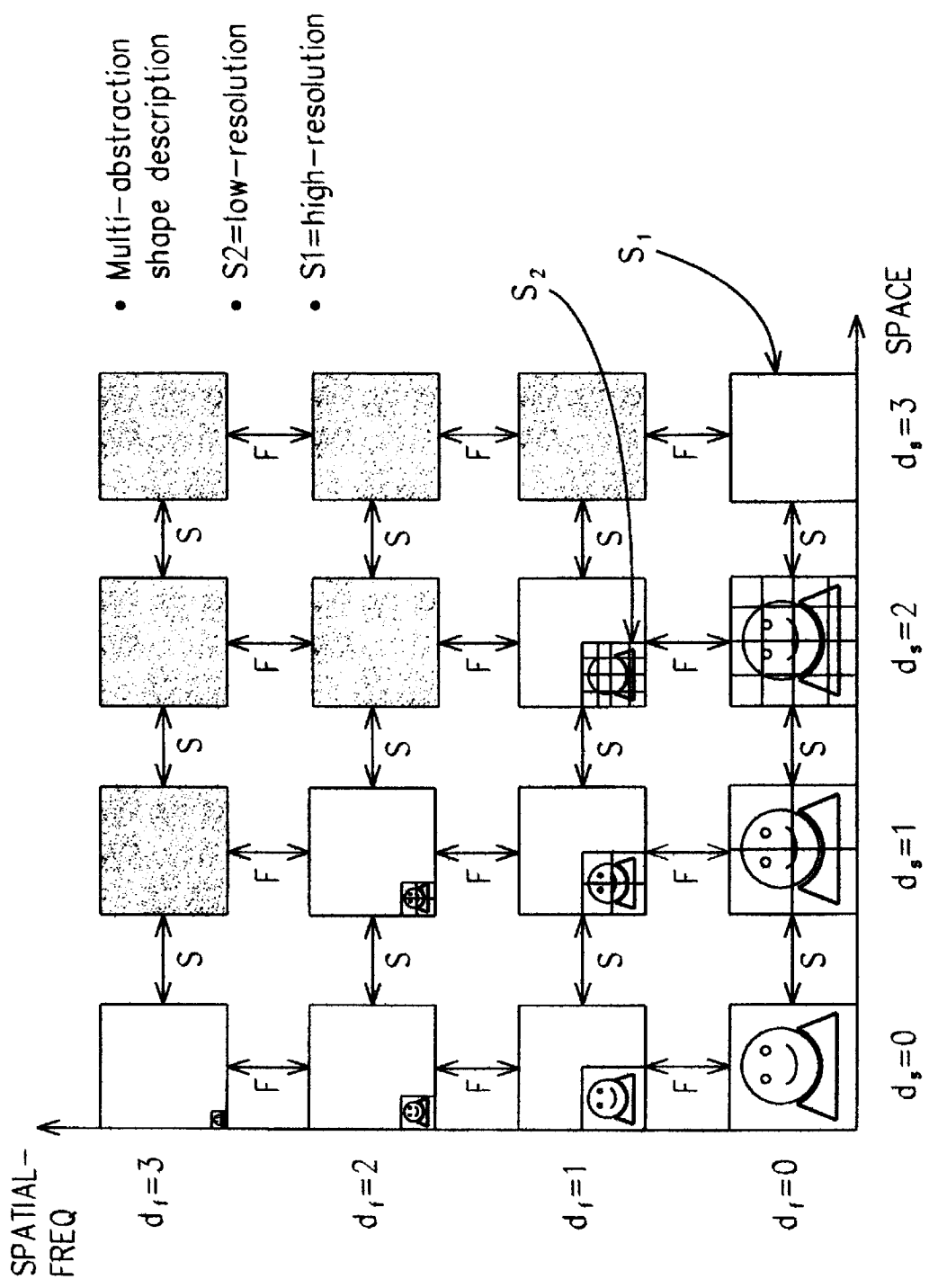
FIG. 16 depicts how shapes can be described at multiple resolutions using sets of space and frequency views.

Similarly, FIG. 16 shows how the space and frequency view description scheme can be used to provide a multi-resolution representation of shapes. A shape can be represented by sets of SFViews at different resolutions in the SFGraph. An arbitrary shape can be represented at full resolution (S1) by a set of SFViews that have a frequency depth in the SFGraph. The space depth of the SFViews can be varied in order to precisely specify the arbitrary boundary of the shape. At a lower resolution (S2), or increasing frequency depth, the shape can be represented more coarsely by specifying fewer, more broad SFViews.

It is proposed that the space and frequency view description scheme can be used to provide a way to describe the derivation of space and frequency descriptors. For example, MPEG-7 will standardize a set of descriptors for images, video and audio. However, it is not practical to standardize all of the possible descriptors and one approach is to create a description definition language (DDL) that can be used to define new descriptors. The space and frequency view description scheme can be used in a description definition language for defining many types of color and texture descriptors. For example, texture features can often be described in terms of spatial-frequency information (See: e.g., T. Chang and C.-C Kuo, "Texture Analysis and Classification with Tree-Structured Wavelet Transform", IEEE Trans. Image Processing, Vol. 3, No. Oct. 4, 1993); and, some texture characterization methods use measures such as energy, entropy, or variance of the wavelet subbands for describing texture features (See: e.g., J. R Smith and S.-F. Chang, "Transform Features for Texture Classification and Discrimination in Large Image Databases", Proc. IEEE Intern. Conf on Image Processing, ICIP-94, Austin, Tex., November 1994). These descriptors can be constructed by specifying a set of SFViews, i.e., in the texture case these may refer to wavelet subbands, and a corresponding measure function that computes a value from each of the views. In the case of the 9-dimensional texture descriptor in the latter above-mentioned article, the descriptor can be defined by the nine-wavelet frequency views in terms of their frequency parameters and the variance measure.

In the case of color indexing, it can be important to describe the color of different regions of the image. In general, there can be many ways to compute the color of each region, including mean color, color histogram, color moments. The space and frequency view description scheme can be used to specify each of the regions in terms of SFViews, and by associating a color measurement function with the space and frequency view description scheme, the spatial-color descriptors can be defined.

While the invention has been described with reference to a preferred embodiment and a plurality of potential applications, it is to be understood that the invention could be modified and implemented for other applications without departing from the spirit and scope of the invention as set forth in the appended claims.

What is claimed by the present invention is:

1. A method for describing multi-dimensional data using space and frequency parameters comprising the steps of:
   analyzing the coverage by said data of the space and frequency planes;
   defining a plurality of view descriptors for specifying regions in the space and frequency planes; and
   assigning at least one of said plurality of view descriptors based on said coverage by said data.

2. The method of claim 1 wherein said plurality of view descriptors comprise a plurality of object classes.

3. The method of claim 1 wherein said regions in the space and frequency planes comprise at least one of regions in space, time, resolution and frequency.

4. The method of claim 1 wherein more than one of said plurality of view descriptors is assigned further comprising identifying at least one relationship between said more than one view descriptors.

5. The method of claim 1 wherein said assigining view descriptors comprises the steps of:
   performing a space determination to determine if said data can be represented using a space view and representing said data with a space view based on an affirmative space determination;
   performing a resolution determination to determine if the space view exists at more than one resolution and defining a resolution view based on an affirmative resolution determination;
   performing a frequency determination if at least one of the space view and the resolution view can exist at a range of resolutions and defining a frequency view based on an affirmative frequency determination; and
   determining whether said data can simultaneously occupy regions in space and frequency and generating a space and frequency view to describe the data which can simultaneouldy occupy said regions.

6. The method of claim 5 further comprising, for data which comprise a collection of views the steps of assigning a set of views; and
   creating a space and frequency tiling for specifying the partitioning of the data using said set of views.

7. The method of claim 5 further comprising for data which include decompositions of the data in space and frequency the steps of:

assigning a set of views; and creating a space and frequency tiling for specifying the partitioning of the data using said set of views.

8. The method of claim 6 further comprising the steps of:

ascertaining if the space and frequency tiling is complete by determining if the set of views completely covers the space; and refining the space and frequenty tiling to a space and frequency partitioning for the data if said set of views completely covers the space.

9. The method of claim 7 further comprising the steps of:

ascertaining if the space and frequency fling is complete by determining if the set of views completely covers the space; and refining the space and frequenty tiling to a space and frequency partitioning for the data if said set of views completely covers the space.

10. The method of claim 6 further comprising the steps of ascertaining if there is at least one processing dependency which defines a hierarchy among the views; and defining at least one hierarchical decomposition of the views based on the at least one processing dependency.

11. The method of claim 7 further comprising the steps of:

ascertaining if there is at least one processing dependency which defines a hierarchy among the views; and defining at least one hierarchical decomposition of the views based on the at least one processing dependency.

12. The method of claim 10 wherein said defining at least one hierarchical decomposition of the views comprises the steps of developing a space and frequency pyramid if there is only one view at each level of the hierarchy;

developing a space and frequency tree if there is a space and frequency partitioning at each level of the hierarchy; and developing a space and frequency graph if there is a space and frequency partitioning at each level of the hierarchy and if there are multiple processing dependencies among the views in the hierarchy.

13. The method of claim 11 wherein said defining at least one hierarchical decomposition of the views comprises the steps of:

developing a space and frequency pyramid if there is only one view at each level of the hierarchy;

developing a space and frequency tree if there is a space and frequency partitioning at each level of the hierarchy; and developing a space and frequency graph if there is a space and frequency partitioning at each level of the hierarchy and if there are multiple processing dependencies among the views in the hierarchy.

14. The method of claim 12 wherein said views correspond to dyadic regions in space and frequency and wherein said hierarchical decomposition comprises a space and frequency graph.

15. The method of claim 1 further comprising annotating said at least one view descriptor with additional view information.

16. The method of claim 15 wherein said additional view information comprises processing information for processing said data.

17. A system for describing multi-dimensional data comprising:

an analyzer for analyzing the coverage by said data of the space and frequency planes;

at least one processor for defining a plurality of view descriptors for specifying regions in the space and frequency planes; view descriptor component for assigning at least one of said plurality of view descriptors based on said coverage by said data.

18. A program storage device readable by machine, tangibly embodying a program of instructions executable by the machine to perform method steps for describing multi-dimensional data using space and frequency parameters, the method comprising the steps of:

analyzing the coverage by said data of the space and frequency planes;

defining a plurality of view descriptors for specifying regions in the space and frequency planes; and assigning at least one of said plurality of view descriptors based on said coverage by said data.

19. An improved method for storage of multi-dimensional data comprising the steps of:

storing said data in the appropriate format; and describing the data using space and frequency parameters which are not dependent upon the storage format.

20. The method of claim 19 wherein said describing comprises the steps of:

analyzing the coverage by said data of the space and frequency planes;

defining a plurality of view descriptors for specifying regions in the space and frequency planes; and assigning at least one of said plurality of view descriptors based on said coverage by said data.

21. A method for providing an abstraction layer between existing image, video and audio data description schemes of views of data and the data described by said schemes comprising the steps of:

re-characterizing the views in terms of space and frequency parameters to generate at least one view descriptor for the data; and using the at least one view descriptor to access the described data.

22. A method for facilitating client retrieval of views of data from a server comprising the steps of:

re-characterizing the views in terms of space and frequency parameters to generate at least one view descriptor for the data; and using the at least one view descriptor to access the described data.

23. The method of claim 22 wherein said re-characterizing is performed at the client.

24. The method of claim 22 wherein said re-characterizing is performed at the server.

\* \* \* \* \*